(12) United States Patent
Becka

(10) Patent No.: US 9,689,888 B2
(45) Date of Patent: Jun. 27, 2017

(54) IN-PLANE VIBRATING BEAM ACCELEROMETER

(71) Applicant: Honeywell International Inc., Morristown, NJ (US)

(72) Inventor: Stephen F. Becka, North Bend, WA (US)

(73) Assignee: Honeywell International Inc., Morris Plains, NJ (US)

( * ) Notice: Subject to any disclaimer, the term of this patent is extended or adjusted under 35 U.S.C. 154(b) by 175 days.

(21) Appl. No.: 14/542,323

(22) Filed: Nov. 14, 2014

(65) Prior Publication Data

US 2016/0139171 A1    May 19, 2016

(51) Int. Cl.
| | | |
|---|---|---|
| *G01P 15/097* | (2006.01) | |
| *G01P 15/08* | (2006.01) | |
| *G01P 15/10* | (2006.01) | |
| *G01P 15/03* | (2006.01) | |
| *G01P 15/09* | (2006.01) | |

(52) U.S. Cl.
CPC ........ *G01P 15/032* (2013.01); *G01P 15/0802* (2013.01); *G01P 15/097* (2013.01); *G01P 15/0922* (2013.01); *G01P 2015/0817* (2013.01)

(58) Field of Classification Search
CPC .... G01P 15/097; G01P 15/0802; G01P 15/18; G01P 15/03; G01P 2015/0817
USPC ...................................................... 73/514.29
See application file for complete search history.

(56) References Cited

U.S. PATENT DOCUMENTS

| | | | |
|---|---|---|---|
| 4,498,344 A | | 2/1985 | Dinger |
| 4,879,914 A | * | 11/1989 | Norling .................. G01L 1/162 |
| | | | 73/514.29 |
| 4,901,586 A | * | 2/1990 | Blake ......................... G01L 1/10 |
| | | | 73/514.29 |
| 4,939,935 A | * | 7/1990 | Amand .................... G01P 1/006 |
| | | | 73/514.29 |
| 5,005,413 A | * | 4/1991 | Novack ................. G01P 15/097 |
| | | | 73/514.29 |

(Continued)

FOREIGN PATENT DOCUMENTS

| | | |
|---|---|---|
| EP | 0674761 B1 | 10/1997 |
| WO | 2006039560 A2 | 4/2006 |

OTHER PUBLICATIONS

Lee, J.E.-Y. et al., "An axial strain modulated double-ended tuning fork electrometer," Elsevier Sensors and Actuators A 148, Sep. 2008, pp. 395-400.

(Continued)

*Primary Examiner* — Helen Kwok
(74) *Attorney, Agent, or Firm* — Shumaker & Sieffert, P.A.

(57) ABSTRACT

A device is described that includes a pendulous proof mass, a support base, a flexure, and at least two resonators. The support base defines a plane and supports the pendulous proof mass. The flexure flexibly connects the pendulous proof mass to the support base, suspends the pendulous proof mass within the support base, and in response to an acceleration of the device, the pendulous proof mass rotates about the flexure in the plane defined by the support base. The at least two resonators flexibly connect the pendulous proof mass to the support base and flex based on the rotation of the pendulous proof mass about the flexure, wherein each of the at least two resonators resonate at a respective resonant frequency.

20 Claims, 7 Drawing Sheets

(56) References Cited

U.S. PATENT DOCUMENTS

| | | | |
|---|---|---|---|
| 5,265,473 A * | 11/1993 | Funabashi | G01P 15/097 310/327 |
| 5,379,639 A * | 1/1995 | Hulsing, II | G01D 21/02 374/117 |
| 5,458,000 A | 10/1995 | Burns et al. | |
| 5,594,170 A * | 1/1997 | Peters | G01P 1/003 73/514.29 |
| 5,783,973 A | 7/1998 | Weinberg et al. | |
| 5,969,249 A * | 10/1999 | Roessig | G01P 15/0802 73/514.15 |
| 6,145,380 A | 11/2000 | MacGugan | |
| 6,230,565 B1 * | 5/2001 | Foote | G01P 15/097 73/497 |
| 6,248,610 B1 | 6/2001 | Leonardson et al. | |
| 6,453,744 B2 | 9/2002 | Williams | |
| 6,484,578 B2 | 11/2002 | Woodruff et al. | |
| 6,595,054 B2 * | 7/2003 | Paros | G01C 19/5607 73/504.04 |
| 6,634,231 B2 | 10/2003 | Malametz | |
| 6,662,658 B2 * | 12/2003 | Foote | B81B 3/0051 73/514.29 |
| 6,826,960 B2 | 12/2004 | Schaad et al. | |
| 7,178,401 B2 | 2/2007 | Byrd | |
| 7,467,553 B2 * | 12/2008 | Meyer | G01P 15/125 73/514.29 |
| 7,954,215 B2 | 6/2011 | Saito | |
| 9,261,525 B2 * | 2/2016 | Thiruvenkatanathan | G01C 19/5726 |
| 2006/0225506 A1 * | 10/2006 | Madni | G01C 19/56 73/514.29 |
| 2007/0236213 A1 | 10/2007 | Paden et al. | |
| 2009/0241665 A1 * | 10/2009 | Novack | G01P 15/097 73/514.29 |
| 2011/0100125 A1 * | 5/2011 | Sato | G01P 15/097 73/514.29 |
| 2012/0132003 A1 * | 5/2012 | Comi | G01P 15/0888 73/514.29 |
| 2012/0192649 A1 | 8/2012 | Strehlow et al. | |
| 2013/0333175 A1 | 12/2013 | Acar et al. | |
| 2014/0253219 A1 | 9/2014 | Caffee et al. | |
| 2016/0139170 A1 * | 5/2016 | Dwyer | G01L 1/22 73/514.29 |

OTHER PUBLICATIONS

Seshia, A.A. et al., "A Vacuum Packaged Surface Micromachined Resonant Accelerometer," Journal of Microelectromechanical Systems, vol. 11, No. 6, Dec. 2002, pp. 784-793.

Extended Search Report from counterpart European Application No. 15193760.4, dated Apr. 8, 2016, 7 pp.

U.S. Appl. No. 14/542,277, by Honeywell International Inc. (Inventors: Paul W. Dwyer et al.), filed Nov. 14, 2014.

Response to Office Action dated Oct. 11, 2016, from U.S. Appl. No. 14/542,277, filed on Dec. 9, 2016, 12 pp.

Response to Extended European Search Report, dated May 23, 2016, from counterpart European Application No. EP 15193760.4, filed on Nov. 14, 2016, 53 pp.

Offce Action from U.S. Appl. No. 14/542,277, dated Oct. 11, 2016, 15 pp.

Final Rejection from U.S. Appl. No. 14/542,277, dated Mar. 8, 2017, 13 pp.

Notice of Intent to Grant from counterpart European Application No. 15193760.4, dated Jan. 26, 2017, 37 pp.

Response to Final Office Action mailed Mar. 8, 2017 from U.S. Appl. No. 14/542,277, filed on May 8, 2017, 9 pp.

* cited by examiner

IN-PLANE VIBRATING BEAM ACCELEROMETER

TECHNICAL FIELD

This disclosure relates to accelerometers.

BACKGROUND

Accelerometers function by detecting a displacement of a proof mass under inertial forces. In one example, an accelerometer may detect the displacement of a proof mass by the change in frequency of a double-ended tuning fork (DETF) connected between the proof mass and a support base. In this example, the tines of the DETF may be composed of a piezoelectric or a silicon material. The DETF is a resonator, which is specifically designed to change frequency proportional to the load applied by the proof mass under acceleration. The DETF resonance is sustained through a plurality of electrodes connecting the DETF to an oscillator, which provides energy to the DETF satisfying the Barkhausen stability criterion.

SUMMARY

In general, the disclosure is directed to a monolithic accelerometer with an in-plane pendulous proof mass. For example, a monolithic accelerometer configured in accordance with the techniques of this disclosure may include at least two or more resonators, an optional tether, and a flexure, which may be configured to flex upon a rotation of a pendulous proof mass about the flexure in the plane defined by a support base of the accelerometer. In one example, the at least two or more resonators may each include a respective double-ended tuning fork (DETF) and a respective plurality of electrodes, where each respective DETF is specifically designed to change frequency proportional to the load applied by the proof mass under acceleration.

In one example, a device includes a pendulous proof mass, a support base, a flexure, and at least two resonators. The support base defines a plane and supports the pendulous proof mass. The flexure flexibly connects the pendulous proof mass to the support base, the flexure suspends the pendulous proof mass within the support base, and in response to an acceleration of the device, the pendulous proof mass rotates about the flexure in the plane defined by the support base. The at least two resonators flexibly connect the pendulous proof mass to the support base and flex based on the rotation of the pendulous proof mass about the flexure, and each of the at least two resonators resonate at a respective resonant frequency.

In another example, a method includes maintaining, by a plurality of electrodes, resonance of at least two resonators of an accelerometer, receiving, by a first resonator upon rotation of the pendulous proof mass about a flexure in a plane defined by a support base, a first force, receiving, by a second resonator upon rotation of the pendulous proof mass about the flexure in the plane defined by the support base, a second force, detecting, by the plurality of electrodes, respective signals that are indicative of a respective change in the resonant frequency of each of the first and second resonators caused by the first force and the second force. The method may also include, outputting, by the accelerometer, the respective signals.

In another example, a method of making an accelerometer that includes masking a substrate that comprises a material with a photoresist, and removing at least a portion of the material from the substrate to form a plurality of features on the substrate. The plurality of features includes a pendulous proof mass, a support base, a flexure, and at least two resonators, and the plurality of features are comprised essentially of a material. The support base is defining a plane and configured to support the pendulous proof mass. The flexure flexibly connects the pendulous proof mass to the support base, and the pendulous proof mass rotates about the flexure in the plane defined by the support base. The at least two resonators flexibly connect the pendulous proof mass to the support base and flex based on the rotation of the pendulous proof mass about the flexure.

The details of one or more examples of the disclosure are set forth in the accompanying drawings and the description below. Other features, objects, and advantages of the disclosure will be apparent from the description and drawings, and from the claims.

DETAILED DESCRIPTION

An accelerometer measures acceleration of the accelerometer itself with respect to an inertial reference frame. In general, vibrating beam accelerometers (VBAs) manufactured using macro methods sense only out-of-plane displacement of the proof mass, are relatively expensive to produce, and possess numerous mechanical joints between parts that lead to performance limitations. VBAs manufactured using monolithic microelectromechanical system (MEMS) manufacturing techniques, typically sense out-of-plane displacement of a pendulous rotating proof mass, and may require proper attachment of the resonant sensors in order to obtain leveraged amplification of the proof mass. Traditional in-plane monolithic MEMS accelerometers with a linear motion translating proof mass require separate lever arms in the structure in order to mechanically amplify the proof mass force applied to the resonators. The added lever arms require undesired complexity (e.g., additional coupling joints and variables), which increases the overall error in acceleration measurement.

Techniques and devices are disclosed herein of vibrating beam accelerometers manufactured using monolithic MEMS manufacturing techniques (e.g., isotropic etching, chemical etching, deep reactive-ion etching (DRIE), or the like) composed of a monolithic material (e.g., quartz or silicon) with a minimum number of required bond joints. For example, techniques and devices disclosed herein include a monolithic, planar (i.e., all features are the same thickness), vibrating beam accelerometer mechanism with an in-plane pendulous proof mass. The pendulous proof mass rotates in the plane of the support base (e.g., a quartz or silicon wafer) about a hinge formed by a flexure. The resonators convert the force from rotation of the pendulous proof mass under acceleration to a frequency, and are located adjacent to the pendulous proof mass so that the resonators receive the pendulous proof mass farce amplified through an inherent first class lever. In other words, as the in-plane pendulous proof mass rotates about the hinge formed by the flexure, in contrast to in-plane translational proof mass, a natural first class lever is created. In this example, an in-plane, monolithic accelerometer is mechanized without the need of adding separate leveraging elements as required in translational in-plane accelerometers. Further, accelerometers configured in accordance with techniques of this disclosure may enable the creation of accelerometers that are more accurate, have a smaller profile, may be produced at reduced cost, have high reliability, and include a digital output.

Figure 1:
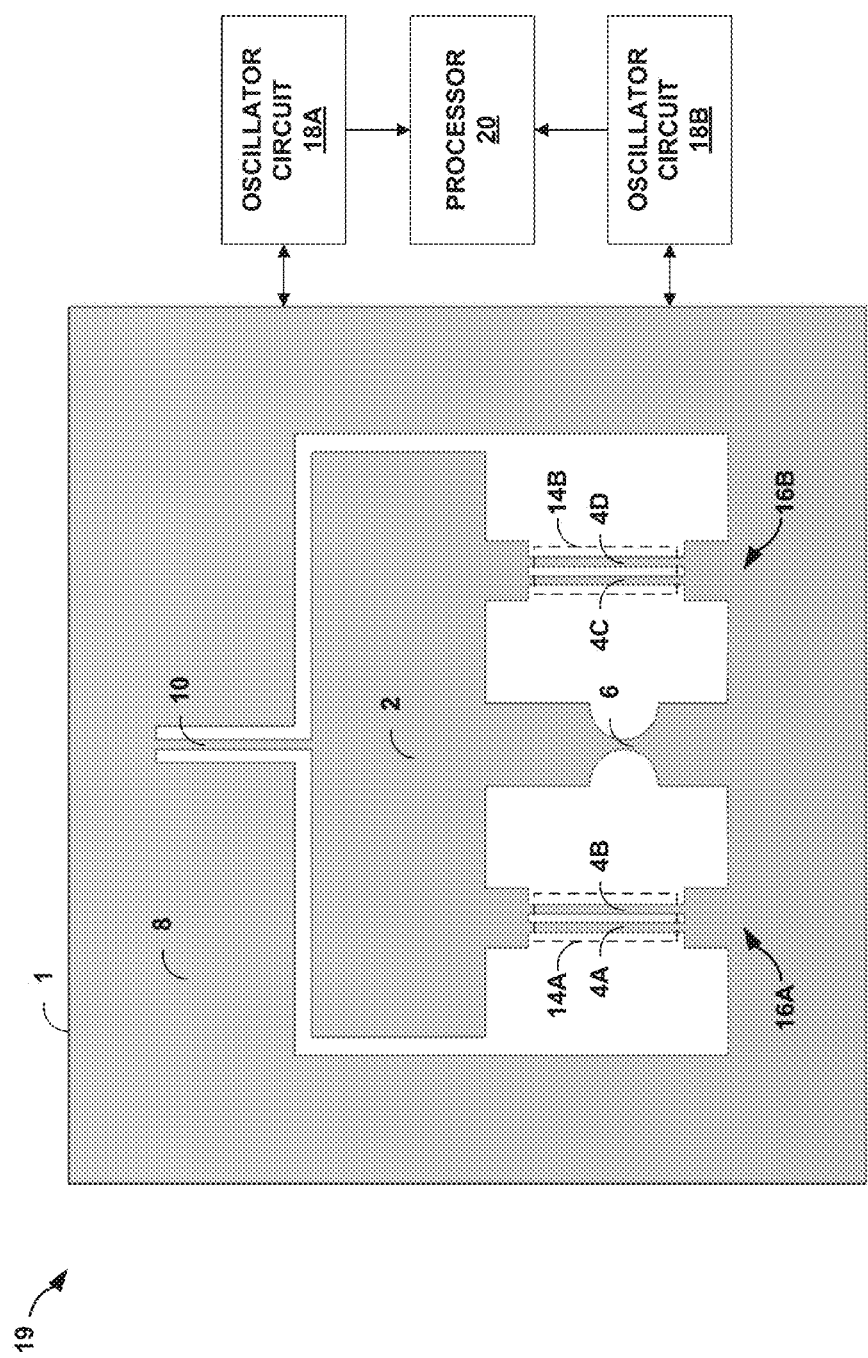
FIG. 1 is a block diagram illustrating an example accelerometer system, in accordance with the techniques described herein.

FIG. 1 is a block diagram illustrating an example accelerometer system 19, in accordance with the techniques described herein. In the example of FIG. 1, accelerometer system 19 includes accelerometer 1, oscillator circuits 18A and 18B, and processor 20. Accelerometer 1 includes pendulous proof mass 2, tines 4A-4D (collectively "tines 4") flexure 6, support base 8, tether 10, electrodes 14A and 14B, and resonators 16A and 16B. In some examples, accelerometer 1 could be a micro-electromechanical systems (MEMS) accelerometer.

Pendulous proof mass 2 rotates about an axis normal to the plane as defined by support base 8 due to the acceleration of accelerometer 1. In some examples, pendulous proof mass 2 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, pendulous proof mass 2 is made of silicon. In some examples, pendulous proof mass 2 ray allow force amplification through the principal of a first class lever.

Tines 4 enable the detection of the amount of force (e.g., increase or decrease of force) in accelerometer 1 by the change in their resonant frequency due to change in force on tines 4. In some examples, tines 4 are made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, tines 4 are made of a silicon material. In some examples, tines 4 may be part of resonators 16A and 16B. For instance, tines 4 may be part of a double-ended tuning fork (DETF). In some examples, tines 4 may vibrate at a resonant frequency, which is a function of the load applied across tines 4. In this example, tines 4 vibrating at a resonant frequency may also have a change in frequency when a force (e.g., compression or tension) is placed on tines 4. In some examples, tines 4 are surrounded by a plurality of electrodes. For example, the plurality of electrodes may be adjacent to and/or underneath tines 4. In these examples, tines 4 may maintain their resonance (i.e., continue to vibrate in-plane and out-of-phase) from an electric field provided by the plurality of electrodes (e.g., the plurality of electrodes functioning as drive electrodes). In these examples, the position of tines 4 may also be determined by the plurality of electrodes (e.g., the plurality of electrodes functioning as pickoff electrodes). In some examples, the resonant frequency of tines 4 may be detected by the plurality of electrodes, such that the plurality of electrodes provide tine position pickoff signals that may be amplified independently, and any change to the frequency of each signal is interpreted as acceleration. In these examples, changes in a plurality of tine position pickoff signals from respective DETFs may be combined and interpreted as an amount of acceleration of accelerometer 1.

Flexure 6 flexibly connects pendulous proof mass 2 to support base 8 and supports pendulous proof mass 2 within support base 8. In some examples, flexure 6 is made of a piezoelectric material, such as quartz (SiO2), berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, flexure 6 is made of a silicon material. In some examples, flexure 6 may form a hinge that enables pendulous proof mass 2 to pivot about flexure 6 in the plane defined by support base 8 due to acceleration of accelerometer 1.

Support base 8 provides support to pendulous proof mass 2 through flexure 6, resonators 16A and 16B, and tether 10, and may contain forces which may displace pendulous proof mass 2. In some examples, support base 8 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN). etc. In other examples, support base 8 is made of a silicon material. In some examples, support base 8 may be planar, defining a plane in which pendulous proof mass 2, tines 4, flexure 6, tether 10, and resonators 16A and 16B are also located in the defined plane. In one example, support base 8 may be composed of a monolithic material with a plurality of features etched to form a top layer of accelerometer 1. In another example, support base 8 may consist essentially of a piezoelectric substrate or a silicon substrate.

Tether 10, which is optional, attaches pendulous proof mass 2 to support base 8 to restrict out-of-plane motion (e.g., motion normal to the plane defined by support base 8) of pendulous proof mass 2, while still allowing pendulous proof mass 2 to pivot about the axis created by flexure 6. In some examples, tether 10 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, tether 10 is made of a silicon material. In one example, tether 10 may be flexible in left to right direction, but stiff in the direction out of the plane defined by support base 8. In some examples, tether may substantially longer than the width. In some examples, tether 10 may have "S" bends to permit rotation of pendulous proof mass 2, while restricting out-of-plane motion.

In some examples, accelerometer 1 may be under acceleration from right-to-left. The acceleration of accelerometer 1 from right-to-left may cause a rotation of pendulous proof mass 2 from left-to-right by the Newtonian force, which is a force equal to mass multiplied by acceleration. The rotation of pendulous proof mass 2 from left-to-right causes the central mass of pendulous proof mass 2 to rotate about the hinge created by flexure 6, such that the left portion of pendulous proof mass 2 moves upward in the plane of support base 8 and away from flexure 6, and the right portion of pendulous proof mass 2 moves downward in the plane of support base 8 and toward flexure 6. The in-plane movement of pendulous proof mass 2 causes resonator 16A to receive tension forces and resonator 16B to receive compression forces, which may change the frequency of resonators 16A and 16B.

Resonators 16A and 16B may be double-ended tuning forks (DETFs) with tines 4, which may detect the rotation of pendulous proof mass 2. Resonators 16A and 16B may also include electrodes 14A and 14B, which may partially surround a portion of tines 4. For example, electrodes 14A and 14B may be adjacent to or applied on tines 4. Each of resonator 16A and 16B may be connected to oscillator circuits 18A and 18B (collectively "oscillator circuits 18"), respectively, by electrodes 14A and 14B to sustain the resonance of tines 4.

Each of electrodes 14A and 14B includes a plurality of electrodes that drive tines 4 to maintain resonance of tines 4 and to detect the position of tines 4. Electrodes 14A and 14B, in combination with oscillator circuits 18, provide a patterned electric field to cause tines 4 to maintain resonance of tines 4. Each of electrodes 14A and 14B adjacent to the corresponding tines 4 may detect the position of the corresponding tines 4 as a respective tine position pickoff signal. Electrodes 14A and 14B may be configured to detect the position of the corresponding tines 4 using capacitive, electromagnetic, or optical means. In some examples, the frequency associated with the respective tine position pickoff signal detected by electrodes 14A and 14B is indicative of the resonant frequency of tines 4. Electrodes 14A and 14B may also provide the detected respective tine position pickoff signal to oscillator circuits 18 which amplifies the respective tine position pickoff signals to create respective resonator drive signals. The respective resonator drive signals may be provided by oscillator circuits 18 to the respective electrodes 14A and 14B to maintain resonance (e.g., in-plane and out-of-phase) of tines 4. The respective tine position pickoff signals may also be amplified independently, and provided as outputs to a processor. In this manner, electrodes 14A and 14B may detect the rotation of pendulous proof mass 2 by detecting respective tine position pickoff signals, each respective tine position pickoff signal with a frequency indicative of a change in the resonant frequency of tines 4.

Electrodes 14A and 14B may include structures located on tines 4 or a base layer (not shown). For instance, electrodes 14A and 14B may include a plurality of electrodes that are vapor deposited on the base layer that surrounds tines 4 or may be applied by direct fusion bonding the base layer to support base 8. In some examples, electrodes 14A and 14B of a base layer may be applied by using braze materials, epoxies, or adhesives to bond the base layer to support base 8. In some examples, electrodes 14A and 14B may have charges sent from an attached electronics (e.g., an oscillator circuit, or the like) via wire bonding, and metallization patterns may be applied as electrodes 14A and 14B through vacuum deposition.

Oscillator circuits 18 may be respective oscillator circuits that maintain resonance of tines 4 of resonators 16A and 16B. For example, oscillator circuit 18A may be connected to resonator 16A by electrodes 14A, oscillator circuit 18B may be connected to resonator 16B by electrodes 14B, and oscillator circuit 18A and 18B may be used to sustain the resonance of resonator 16A and 16B, respectively. In this example, oscillator circuits 18 may use a detected instantaneous DETF tine position from electrodes 14A and 14B, e.g., respective tine position pickoff signals, and subsequently amplifying the respective tine position pickoff signals to create respective resonator drive signals, which are then applied to resonators 16A and 16B using electrodes 14A and 14B. The frequency of resonators 16A and 16B may be a function of the load applied across tines 4 (e.g., by the movement of pendulous proof mass 2). In this manner, where the respective resonator drive signals are in phase with the respective tine position pickoff signals, the respective resonator drive signals satisfy the Barkhausen stability criterion.

Processor 20 as well as other processors disclosed herein can each comprise any suitable arrangement of hardware, software, firmware, or any combination thereof, to perform the techniques attributed to the respective processor 20 herein. For example, processor 20 may each include any one or more microprocessors, digital signal processors (DSPs), application specific integrated circuits (ASICs), field programmable gate arrays (FPGAs), or any other equivalent integrated or discrete logic circuitry, as well as any combinations of such components.

In general, processor 20 receives data from accelerometer 1. For example, processor 20 may receive signals from accelerometer 1 indicative of an amount of acceleration of accelerometer 1. Processor 20 may also receive signals indicative of the changes in frequency of tines 4 of resonators 16A and 16B. In some examples, processor 20 may use data from accelerometer 1 to determine an acceleration value based on the amount of acceleration of accelerometer 1.

In the example of FIG. 1, resonators 16A and 16B, and flexure 6 are connected between pendulous proof mass 2 and support base 8 at a first side of pendulous proof mass 2. In some examples, optional tether 10 may connect pendulous proof mass 2 and support base 8 at a second side of pendulous proof mass 2, where the second side is opposite from the first side of pendulous proof mass 2. In the example of FIG. 1, resonators 16A and 16B, and flexure 6 are within a threshold number of degrees (e.g., plus or minus 5 degrees) parallel to each other, and are within a threshold number of degrees perpendicular (e.g., between 75° and 105°, within plus or minus 15 degrees of perpendicular, etc.) to pendulous proof mass 2. In some examples, resonators 16A and 16B, and flexure 6 may have zero gauge length, which reduces sensitivity to thermal expansion as flexure 6 and resonators 16A and 16B expand at the same rate along similar distances. Although not shown in FIG. 1, in some examples, a housing structure may surround accelerometer 1 and may be attached to support base 8.

Figure 2:
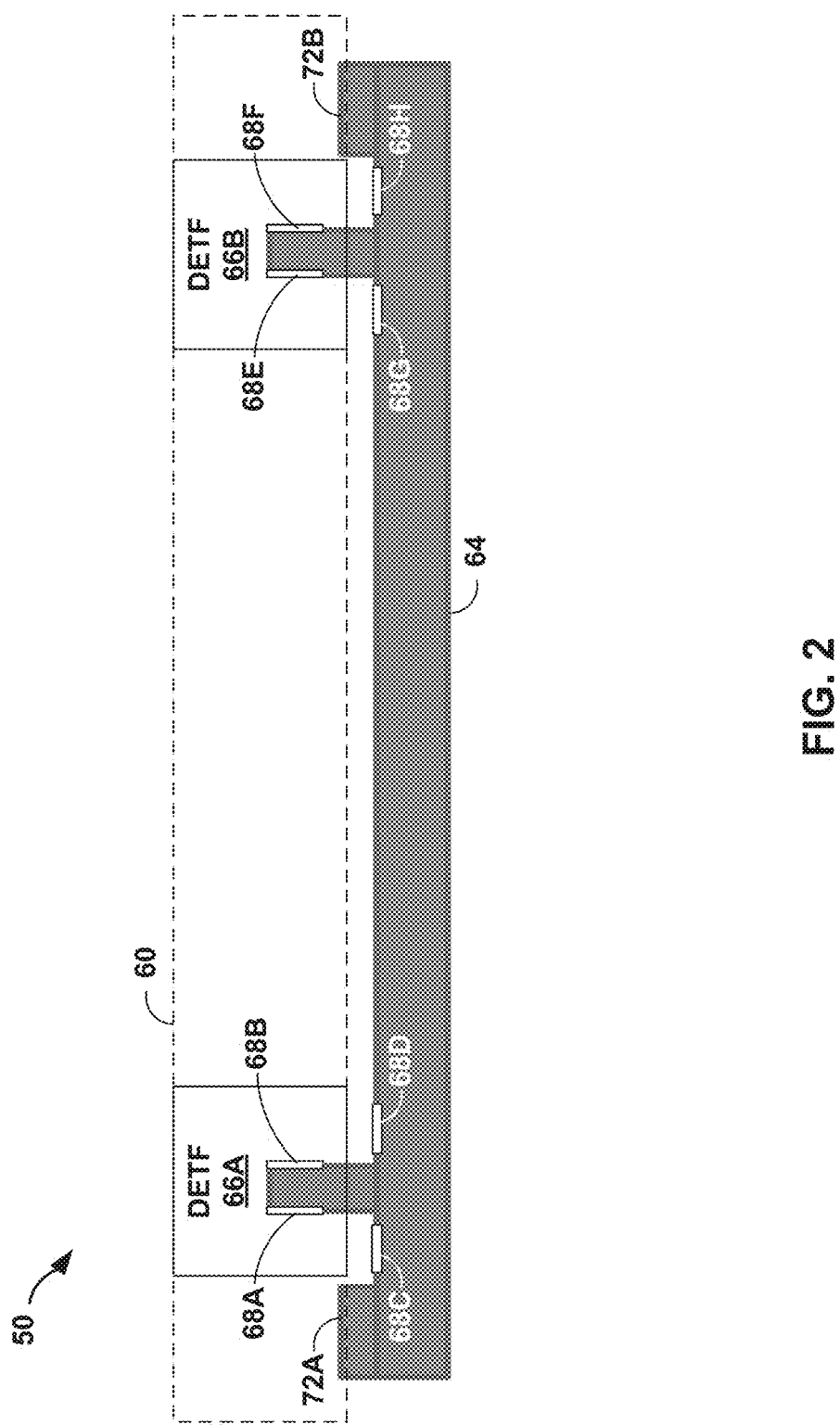
FIG. 2 is a block diagram illustrating a side view of the accelerometer that includes one or more electrodes on the base layer surrounding one or more tines of the DETFs located on the support base, in accordance with the techniques described herein.

FIG. 2 is a block diagram illustrating a side view of an example accelerometer 50 that includes one or more electrodes on base layer 64 surrounding one or more tines of the DETFs located on support base 60, in accordance with the techniques described herein. In the example of FIG. 2, accelerometer 50 includes two double-ended tuning forks (DETFs) 66A and 66B which may correspond to resonators 16A and 16B, respectively, as described in FIG. 1. In the example of FIG. 2, accelerometer 50 also includes support base 60, which may correspond to support base 8, as described in FIG. 1, base layer 64, electrodes 68, and mesas 72A and 72B. Although not shown in FIG. 2, in some examples, a housing structure may surround accelerometer 50 and may be attached to support base 60 and/or base layer 64. In some examples, DETFs 66A and 66B may move in-the-plane with respect to the plane defined by support base 60 while receiving forces (e.g., tension and compression) on the tines of DETFs 66A and 66B as the pendulous proof mass is rotated left and right.

Base layer 64 provides support to support base 60 of accelerometer 50 with mesas 72A and 72B. In some examples, base layer 64 may be made of a piezoelectric material, such as quartz (SiO2), berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, base layer 64 may be made of a silicon material. In some examples, base layer 64 may be attached to support base 60 by brazing or other attachment techniques, such as fusion bonding. In one example, base layer 64 may be constructed separately from support base 60.

Electrodes 68 are metallization surfaces of base layer 64 to form a plurality of electrodes located underneath and adjacent to the tines of DETFs 66A and 66B. In some examples, electrodes 68 may be metallized in a vacuum evaporator with a shadow mask onto base layer 64. For instance, electrodes 68 may be made of gold or any comparable conductive material. In some examples, electrodes 68 may act as drive electrodes in combination with an oscillator circuit (e.g., oscillator circuits 18) to provide a patterned electric field, which maintains the resonance of the tines of DETF 66A and 66B (e.g., vibrate the tines at resonance frequency and in plane and out-of-phase). In some examples, electrodes 68 may act as pickoff electrodes, which may detect a tine position pickoff signal indicative of the position of the tines. In these examples, the frequency of the tine position pickoff signal may be indicative of the resonant frequency of the tines. In this manner, electrodes 68 in combination with the oscillator circuit may be configured to maintain the resonance of the tines of DETFs 66A and 68B. In this manner, electrodes 68 may also be configured to detect the position of the tines of DETFs 66A and 68B as a tine position pickoff signal, which may have changes in frequency indicative of changes in the resonant frequency of the tines caused by forces received from rotation of the pendulous proof mass. In some examples, electrodes 68 may correspond to electrodes 14A and 14B as described in FIG. 1.

Mesas 72A and 72B are separation structures that provide the distance necessary between the tines of 66A and 66B, and electrodes 68, so the tines of DETFs 66A and 66B may vibrate freely, while still maintaining the electric field from electrodes 68. For instance, mesas 72A and 72B may separate the tines from their respective electrodes.

Figure 3:
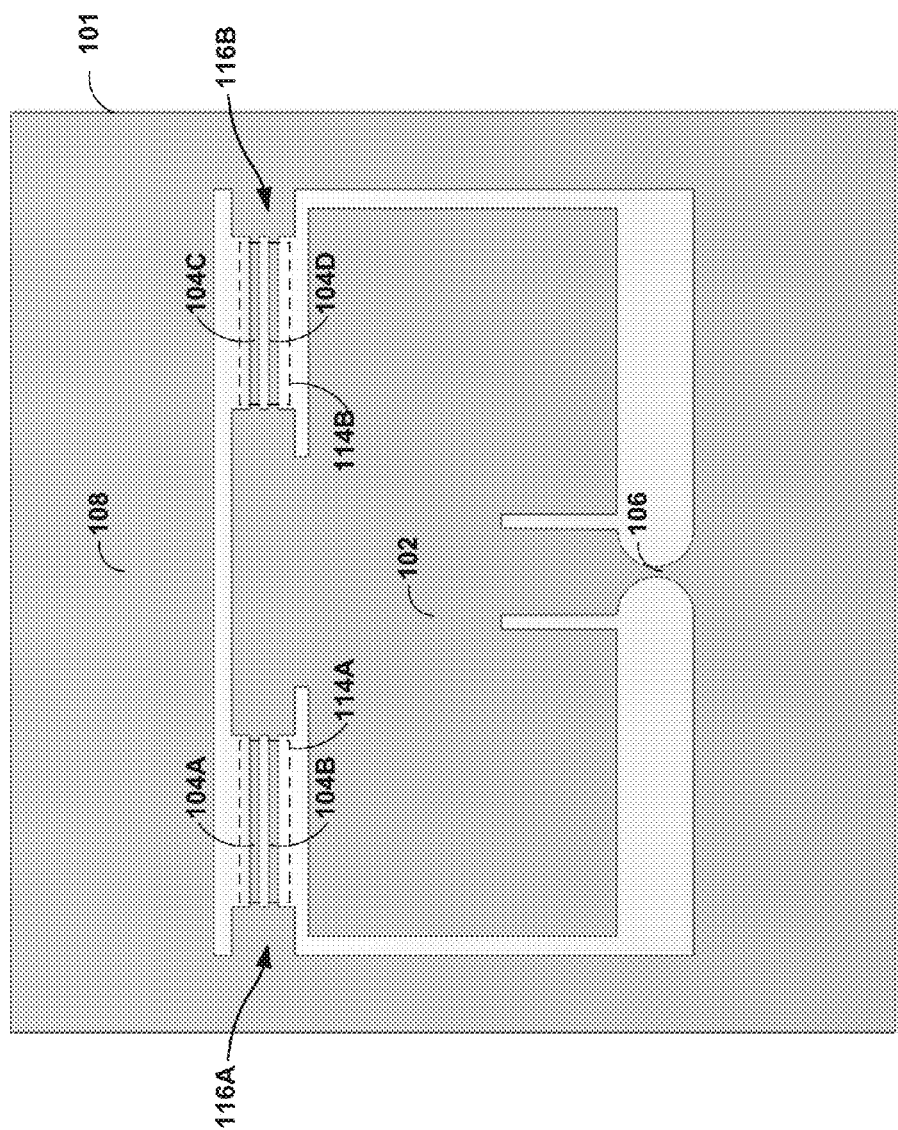
FIG. 3 is a block diagram illustrating a top view of another example accelerometer, in accordance with the techniques described herein.

FIG. 3 is a block diagram illustrating a top view of another example accelerometer 101, in accordance with the techniques described herein. In the example of FIG. 3, accelerometer 101 includes pendulous proof mass 102, tines 104A-104D (collectively "tines 104"), flexure 106, support base 108, electrodes 114A and 114B, and resonators 116A and 116B, which may correspond to pendulous proof mass 2, tines 4, flexure 6, support base 8, electrodes 14A and 14B, and resonators 16A and 16B, respectively. In some examples, accelerometer 101 could be a micro-electromechanical systems (MEMS) accelerometer.

Pendulous proof mass 102 rotates in the plane as defined by support base 108 due to the acceleration of accelerometer 101. Tines 104 enable the detection of the amount of force (e.g., increase or decrease of force) in accelerometer 101 by the change in their frequency due to change in force on tines 104. In some examples, tines 104 may be part of resonators 116A and 116B. For instance, tines 104 may be part of a double-ended tuning fork (DETF). In some examples, tines 104 may maintain resonance when placed in an electric field. In other examples, tines 104 may maintain resonance when provided an electric charge. Tines 104 may have a change in resonant frequency when force (e.g., increases or decreases in force) is placed on tines 104. In some examples, tines 104 may be surrounded by a plurality of electrodes. For example, the plurality of electrodes may be adjacent to and/or underneath tines 104. In these examples, tines 104 may maintain their resonance (i.e., continue to vibrate in-plane and out-of-phase) from an electric field provided by the plurality of electrodes (e.g., functioning as drive electrodes). In these examples, the position of tines 104 may also be determined by the plurality of electrodes (e.g., functioning as pickoff electrodes). In some examples, the resonant frequency of tines 104 may be detected by the plurality of electrodes, such that the plurality of electrodes provide tine position pickoff signals that may be amplified independently, and any change to the frequency of each signal is interpreted as acceleration. In these examples, changes in a plurality of tine position pickoff signals from respective resonators may be combined and interpreted as an amount of acceleration of accelerometer 101.

Flexure 106 flexibly connects pendulous proof mass 102 to support base 108 and supports pendulous proof mass 102 within support base 108. In some examples, flexure 106 may be a hinge that enables pendulous proof mass 102 to pivot about flexure 106 in the plane defined by support base 108 due to acceleration of accelerometer 101.

Support base 108 provides support to pendulous proof mass 102 through flexure 106, and resonators 116A and 116B may contain forces which may displace pendulous proof mass 102. In some examples, support base 108 may be planar, defining a plane in which pendulous proof mass 102, tines 104, flexure 106, and resonators 116A and 116B are also located in the defined plane. For example, support base 108 may be composed of a monolithic material with a plurality of features etched to form a top layer of accelerometer 101. In some examples, support base 108 may consist essentially of a quartz substrate or a silicon substrate.

In the example of FIG. 3, accelerometer 101 includes pendulous proof mass 102, tines 104, flexure 106, support base 108, electrodes 114A and 114B, and resonators 116A and 116B. In this example, accelerometer 101 may be under acceleration from right-to-left. The acceleration of accelerometer 101 from right-to-left may cause a rotation of pendulous proof mass 102 from left-to-right by the Newtonian force, which is a force equal to mass multiplied by acceleration. The rotation of pendulous proof mass 102 from left-to-right may cause the central mass of pendulous proof mass 102 to rotate about the hinge created by flexure 106, such that the upper left portion of pendulous proof mass 102 moves in-plane to the right and the upper right portion of pendulous proof mass 102 moves in-plane to the right. The in-plane movement of pendulous proof mass 102 to the right may cause resonator 116A to receive tension forces and resonator 116B to receive compression forces, which may change the frequency of resonators 116A and 116B.

Resonators 116A and 116B may be double-ended tuning forks (DETFs) with tines 104, which may detect the rotation of pendulous proof mass 102. Resonators 116A and 116B may also include electrodes 114A and 114B, which may partially surround a portion of tines 104. For example, electrodes 114A and 114B may be adjacent to or applied on tines 104. Each of resonators 116A, and 116B may be connected to a respective oscillator circuit e.g., oscillator circuits 18 as described in FIG. 1) by electrodes 114A and 114B to sustain the resonance of tines 104.

The respective oscillator circuits maintain resonance of tines 104 by using a detected instantaneous DETF tine position from electrodes 114A and 114B, e.g., respective tine position pickoff signals, and subsequently amplifying the respective tine position pickoff signals to create respective resonator drive signals, which are then applied to resonators 116A and 116B using electrodes 114A and 114B. The frequency of resonators 116A and 116B may be a function of the load applied across tines 104 (e.g., by the movement of pendulous proof mass 102). In this manner, where the respective resonator drive signals are in phase with the respective tine position pickoff signals, the respective resonator drive signals satisfy the Barkhausen stability criterion.

Each of electrodes 114A and 114B includes a plurality of electrodes that drive tines 104 to maintain resonance of tines 104 and to detect the position of tines 104. Electrodes 114A and 114B, in combination with the respective oscillator circuits, provide a patterned electric field to cause tines 104 to maintain resonance of tines 104. Each of electrodes 114A and 114B adjacent to the corresponding tines 104 may detect the position of the corresponding tines 104 as a respective tine position pickoff signals. Electrodes 114A and 114B may be configured to detect the position of the corresponding tines 104 using capacitive, electromagnetic, or optical means. In some examples, the frequency associated with the respective tine position pickoff signals detected by electrodes 114A and 114B may be indicative of the resonant frequency of tines 104. Electrodes 114A and 114B may also provide the detected respective tine position pickoff signals to respective oscillator circuits which amplify the respective tine position pickoff signals to create respective resonator drive signals. The respective resonator drive signals may be provided by the respective oscillator circuits to respective electrodes 114A and 114B to maintain resonance (e.g., in-plane and out-of-phase) of tines 104. The respective tine position pickoff signals may also be amplified independently, and provided as outputs to a processor (e.g., processor 20). In this manner, electrodes 114A and 114B may detect the rotation of pendulous proof mass 102 by detecting respective tine position pickoff signals, each respective tine position pickoff signal with a frequency indicative of a change in the resonant frequency of tines 104.

Electrodes 114A and 114B may be metallization structures located on tines 104 or a base layer (not shown). For example, electrodes 114A and 114B may include a plurality of electrodes that are vapor deposited on the base layer that surrounds tines 104 or may be applied to support base 108 by direct fusion bonding the base layer to support base 108. In some examples, electrodes 114A and 114B of a base layer may be applied to support base 108 by using braze materials, epoxies, or adhesives to bond the base layer to support base 108. In some examples, electrodes 114A and 114B may have electric charges or electric fields sent from an attached electronics (e.g., an oscillator, or the like) via wire bonding, and metallization patterns applied as electrodes 114A and 114B through vacuum deposition.

In the example of FIG. 3, resonators 116A and 116B and flexure 106 connect pendulous proof mass 102 to support base 108, and resonators 116A and 116B are within a threshold number of degrees perpendicular (e.g., between 75° and 105°, within plus or minus 15 degrees of perpendicular) to flexure 106. In some examples, resonators 116A and 116 provide a push-pull arrangement with respect to proof mass 102. In the example of FIG. 3, flexure 106 is connected near the middle of a first side of pendulous proof mass 102. In the example of FIG. 3, resonators 116A and 116B are connected equidistant from the middle of a second side of pendulous proof mass 102, where the second side is opposite from the first side of pendulous proof mass 102. In some examples, resonators 116A and 116B, and flexure 106 may have zero gauge length, which reduces sensitivity to thermal expansion as flexure 106 and resonators 116A and 116B expand at the same rate along similar distances. Although not shown in FIG. 3, in some examples, a housing structure may surround accelerometer 101 and may be attached to support base 108.

Figure 4:
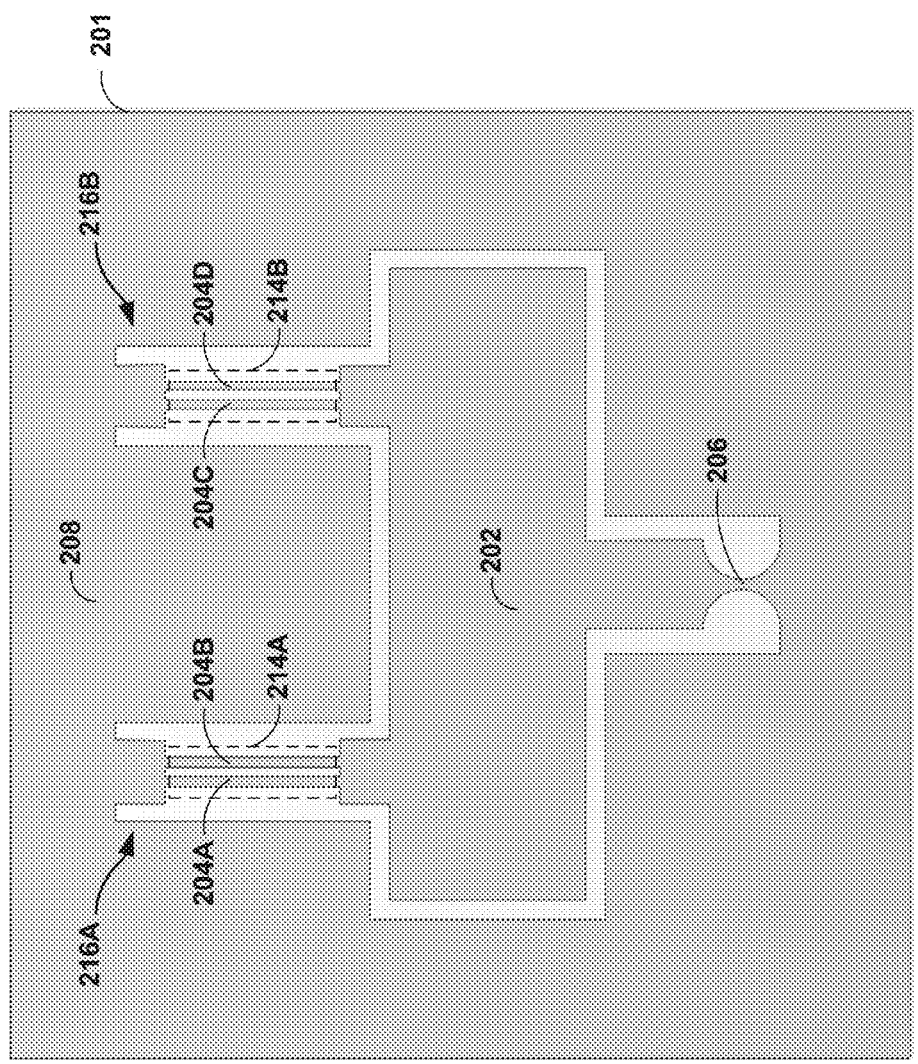
FIG. 4 is a block diagram illustrating a top view of another example accelerometer, in accordance with the techniques described herein.

FIG. 4 is a block diagram illustrating a top view of another example accelerometer 201, in accordance with the techniques described herein. In the example of FIG. 4, accelerometer 201 includes pendulous proof mass 202, tines 204A-204D (collectively "tines 204"), flexure 206, support base 208, electrodes 214A and 214B, and resonators 216A and 216B, which may correspond to pendulous proof mass 2, tines 4, flexure 6, support base 8, electrodes 14A and 14B, and resonators 16A and 16B, respectively as described in FIG. 1. In some examples, accelerometer 201 could be a micro-electromechanical systems (MEMS) accelerometer.

Pendulous proof mass 202 rotates in the plane as defined by support base 208 due to the acceleration of accelerometer 201. Tines 204 enable the detection of the amount of force (e.g., increase or decrease of force) in accelerometer 201 by the change in their resonant frequency due to change in force on tines 204. In some examples, tines 204 may be part of resonators 216A and 216B. For instance, tines 204 may be part of a double-ended tuning fork (DETF). In some examples, tines 204 may vibrate at a resonant frequency, which is a function of the load applied across tines 4. In addition, tines 204 may change in frequency when force (e.g., increases or decreases in force) is placed on tines 204. In some examples, tines 204 may be surrounded by a plurality of electrodes. For example, the plurality of electrodes may be adjacent to and/or underneath tines 204. In these examples, tines 204 may maintain their resonance (i.e., continue to vibrate in-plane and out-of-phase) from an electric field provided by the plurality of electrodes (e.g., functioning as drive electrodes). In these examples, the location of tines 204 may also be determined by the plurality of electrodes (e.g., functioning as pickoff electrodes). In some examples, the resonant frequency of tines 204 may be detected by the plurality of electrodes, such that the plurality of electrodes provide respective tine position pickoff signals that may be amplified independently, and any change to the frequency of each signal is interpreted as acceleration. In these examples, changes in a plurality of tine position pickoff signals from respective DETFs may be combined and interpreted as an amount of acceleration of accelerometer 201.

Flexure 206 flexibly connects pendulous proof mass 202 to support base 208 and supports pendulous proof mass 202 within support base 208. In some examples, flexure 206 may be a hinge that enables pendulous proof mass 202 to pivot about flexure 206 in the plane defined by support base 208 due to acceleration of accelerometer 201.

Support base 208 provides support to pendulous proof mass 202 through flexure 206, resonators 216A and 216B may contain forces which may displace pendulous proof mass 202. For instance, support base 208 may be planar, defining a plane in which pendulous proof mass 202, tines 204, flexure 206, and resonators 216A and 216B are also located in the defined plane. In some examples, support base 208 may be composed of a monolithic material with a plurality of features etched to form a top layer of accelerometer 201. In some examples, support base 208 may consist essentially of a quartz substrate or a silicon substrate.

In the example of FIG. 4, accelerometer 201 includes pendulous proof mass 202, tines 204, flexure 206, support base 208, electrodes 214A and 214B, and resonators 216A and 216B. In this example, accelerometer 201B may be under acceleration from right-to-left. The acceleration of accelerometer 201 from right-to-left may cause a rotation of pendulous proof mass 202 from left-to-right by the Newtonian force, which is a force equal to mass multiplied by acceleration. The rotation of pendulous proof mass 202 from left-to-right may cause the central mass of pendulous proof mass 202 to rotate about the hinge created by flexure 206, such that the upper left portion of pendulous proof mass 202 moves upward in the plane of support base 208 away from flexure 206 and the upper right portion of pendulous proof mass 202 moves downward in the plane of support base 208 toward flexure 206. The in-plane movement of pendulous proof mass 202 may cause resonator 216A to receive compression forces resonator 216B to receive tension forces, which may change the frequency of resonators 216A and 216B.

Resonators 216A and 216B may be double-ended tuning forks (DETFs) with tines 204, which may detect the rotation of pendulous proof mass 202. Resonators 216A and 216B may also include electrodes 214A and 214B, which may partially surround a portion of tines 204. For example, electrodes 214A and 214B may be adjacent to or applied on tines 204. Each of resonators 216A and 216B may be connected to a respective oscillator circuit (e.g., oscillator circuits 18) by electrodes 214A and 214B to sustain the resonance of tines 204.

The respective oscillator circuits (e.g., oscillator circuits 18 as described in FIG. 1) maintain resonance of tines 204 by using a detected instantaneous DETF tine position from electrodes 214A and 214B, e.g., respective tine position pickoff signals, and subsequently amplifying the respective tine position pickoff signals to create respective resonator drive signals, which are then applied to resonators 216A and 216B using electrodes 214A and 214B. The frequency of resonators 216A and 216B may be a function of the load applied across tines 204 by the movement of pendulous proof mass 202). In this manner, where the respective resonator drive signals are in phase with the respective tine position pickoff signals, the respective resonator drive signals satisfy the Barkhausen stability criterion.

Each of electrodes 214A and 214B includes a plurality of electrodes that drive tines 204 to maintain resonance of tines 204 and to detect the position of tines 204. Electrodes 214A and 214B, in combination with the respective oscillator circuits, provide a patterned electric field to cause tines 204 to maintain resonance of tines 204. Each of electrodes 214A and 214B adjacent to the corresponding tines 204 may detect the position of the corresponding tines 204 as a respective tine position pickoff signal. Electrodes 214A and 214B may be configured to detect the position of the corresponding tines 204 using capacitive, electromagnetic, or optical means. In some examples, the frequency associated with the respective tine position pickoff signals detected by electrodes 214A and 214B may be indicative of the resonant frequency of tines 204. Electrodes 214A and 214B may also provide the detected respective tine position pickoff signals to a respective oscillator circuit which amplifies the respective tine position pickoff signals to create a respective resonator drive signals. The respective resonator drive signals may be provided by the respective oscillator circuit to respective electrodes 214A and 214B to maintain resonance (e.g., in-plane and out-of-phase) of tines 204. The respective tine position pickoff signals may also be amplified independently, and provided as outputs to a processor (e.g., processor 20). In this manner, electrodes 214A and 214B may detect the rotation of pendulous proof mass 202 by detecting respective tine position pickoff signals, each respective tine position pickoff signal with a frequency indicative of a change in the resonant frequency of tines 204.

Electrodes 214A and 214B, in some examples, may include structures located on tines 204 or a base layer (not shown). For instance, electrodes 214A and 214B of a base layer may be applied to support base 208 by direct fusion bonding the base layer to support base 208. In other instances, electrodes 214A and 214B of a base layer may be applied to support base 208 by using braze materials, epoxies, or adhesives to bond the base layer to support base 208. In some examples, electrodes 214A and 214B may have metallization patterns applied as electrodes 214A and 214B through vacuum deposition, and electric charges or electric fields sent from an attached electronics (e.g., an oscillator circuit, or the like) via wire bonding.

In the example of FIG. 4, resonators 216A and 216B and flexure 206 connect pendulous proof mass 202 to support base 208, and are within a threshold number of degrees (e.g., plus or minus 5 degrees) parallel to each other, and are within a threshold number of degrees perpendicular (e.g., between 75° and 105°, within plus or minus 15 degrees of perpendicular, etc.) to pendulous proof mass 202. In the example of FIG. 4, flexure 206 is connected near the middle of a first side of pendulous proof mass 202. In the example of FIG. 4, resonators 216A and 216B are connected equidistant from the middle of a second side of pendulous proof mass 202. In some examples, resonators 216A and 216B, and flexure 206 may have zero gauge length, which reduces sensitivity to thermal expansion as flexure 206 and resonators 216A and 216B expand at the same rate along similar distances. Although not shown in FIG. 4, in some examples, a housing structure may surround accelerometer 201 and may be attached to support base 208.

Figure 5A:
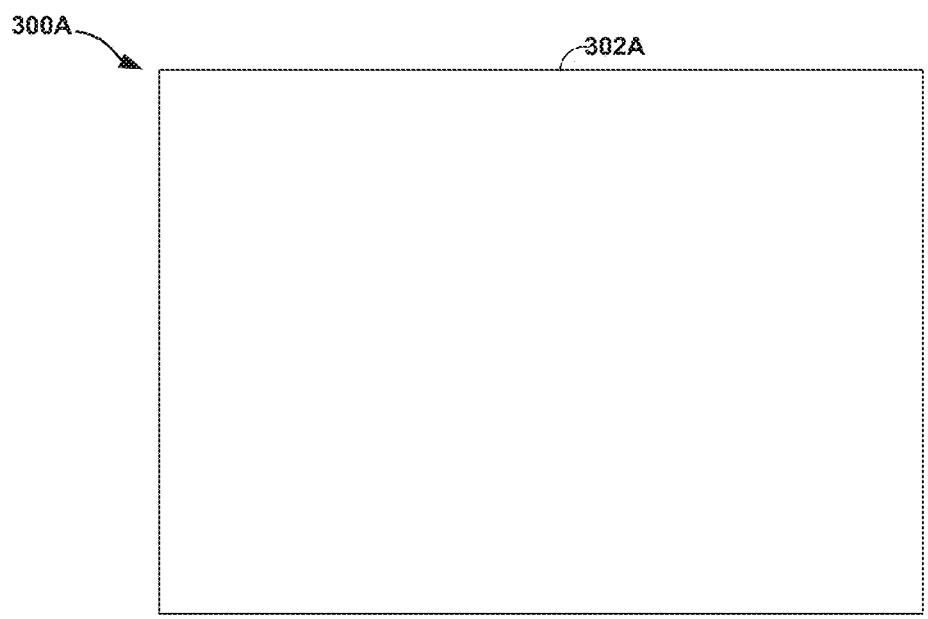
FIGS. 5A-5D are block diagrams illustrating an example formation of an accelerometer that includes a pendulous proof mass configured to rotate in a plane defined by a support base, in accordance with the techniques described herein.

FIGS. 5A-5D are block diagrams illustrating an example formation of an accelerometer that includes a pendulous proof mass configured to rotate in a plane defined by a support base, in accordance with the techniques described herein. In the example of FIG. 5A, accelerometer 300A is substrate 302A. In some examples, substrate 302A may be a material including one of crystalline quartz material or silicon material.

Figure 5B:
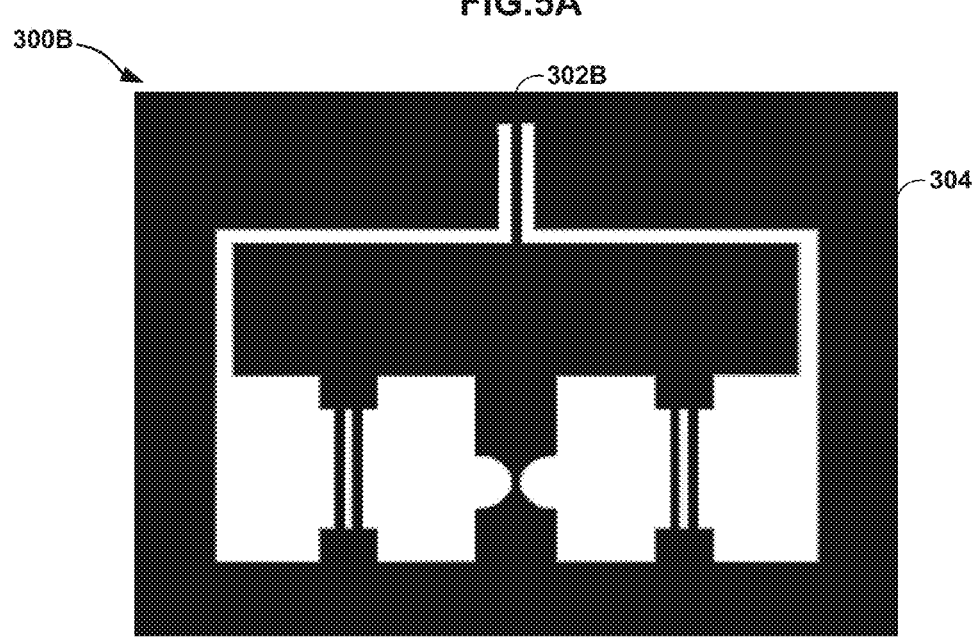

In the example of FIG. 5B, accelerometer 300B is substrate 302B with masking of photoresist 304, which is masked to define a plurality of features on substrate 302B. For example, substrate 302B with masking of photoresist 304 is exposed to an etching technique (e.g., isotropic etching, chemical etching, DRIE etching, or the like) to remove at least a portion of the material from substrate 302B to form a plurality of features on substrate 302B. In this example, the plurality of features etched into substrate 302B may include a support base, a pendulous proof mass, a flexure, an optional tether, and at least two resonators.

Figure 5C:
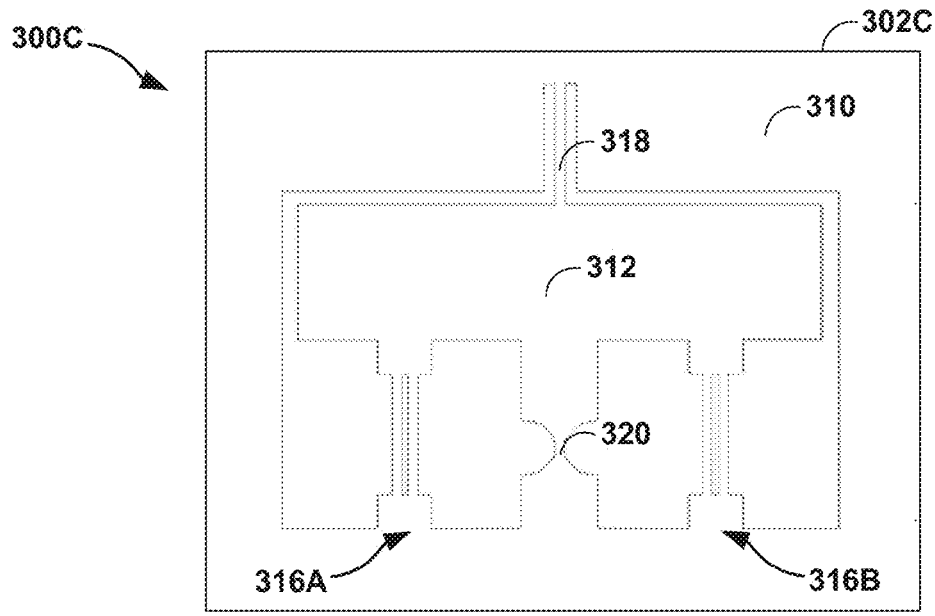

In the example of FIG. 5C, accelerometer 300C is etched substrate 302C. For example, the etchings of etched substrate 302C may define a plurality of features, which may include support base 310, pendulous proof mass 312, resonators 316A and 316B (e.g., double-ended tuning forks), optional tether 318, and flexure 320, which may correspond to support base 10, pendulous proof mass 2, resonators 16A and 16B, optional tether 12, and flexure 6, as described in FIG. 1. In some examples, the plurality of features may be etched from substantially similar material. In some examples, optional tether 318 may couple pendulous proof mass 312 to support base 310. In these examples, optional tether 318 may be configured to restrict out-of-plane motion of pendulous proof mass 312 with respect to the defined plane of support base 310.

Figure 5D:
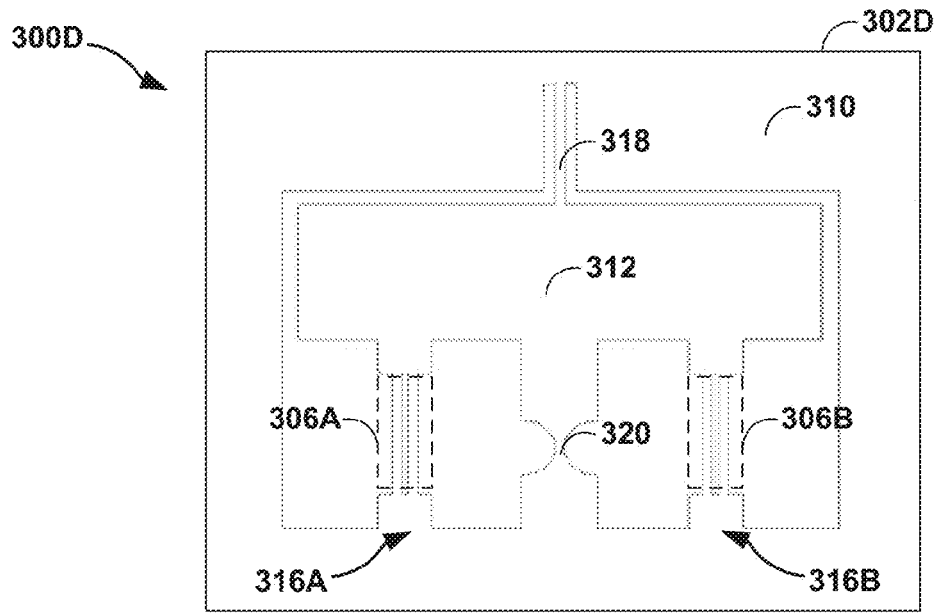

In the example of FIG. 5D, accelerometer 300D is etched quartz substrate 302D, which may have an attached base layer corresponding to base layer 64, as described in FIG. 2, and electrodes 306A-306B, which may correspond to electrodes 68 as described in FIG. 2. For instance, the tines of resonators 316A and 316B and/or the base layer may have metallization applied to form electrodes 306A-306B (e.g., a plurality of electrodes). In some examples, electrodes 306A-306B may surround at least a portion of the tines of resonators 316A and 316B. In some examples, electrodes 306A-306B may be configured in combination with an oscillator circuit (e.g., oscillator circuits 18) to provide a patterned electric field to maintain the resonance of the tines of resonators 316A and 316B. In some examples, electrodes 306A-306B may be configured to detect the position of tines as a signal of resonators 316A and 316B with a frequency indicative of the resonant frequency of the tines. In some examples, the frequency may be indicative of the change in resonant frequency due to a change in the force on the tines of resonators 316A and 316. In some examples, electrodes 306A-306B may be located on at least a portion of the tines of resonators 316A and 316B. In some examples, electrodes 306A-306B may be configured in combination with the oscillator circuit to provide an electric charge to maintain the resonance of the tines of resonators 316A and 316B using the piezoelectric effect.

Figure 6:
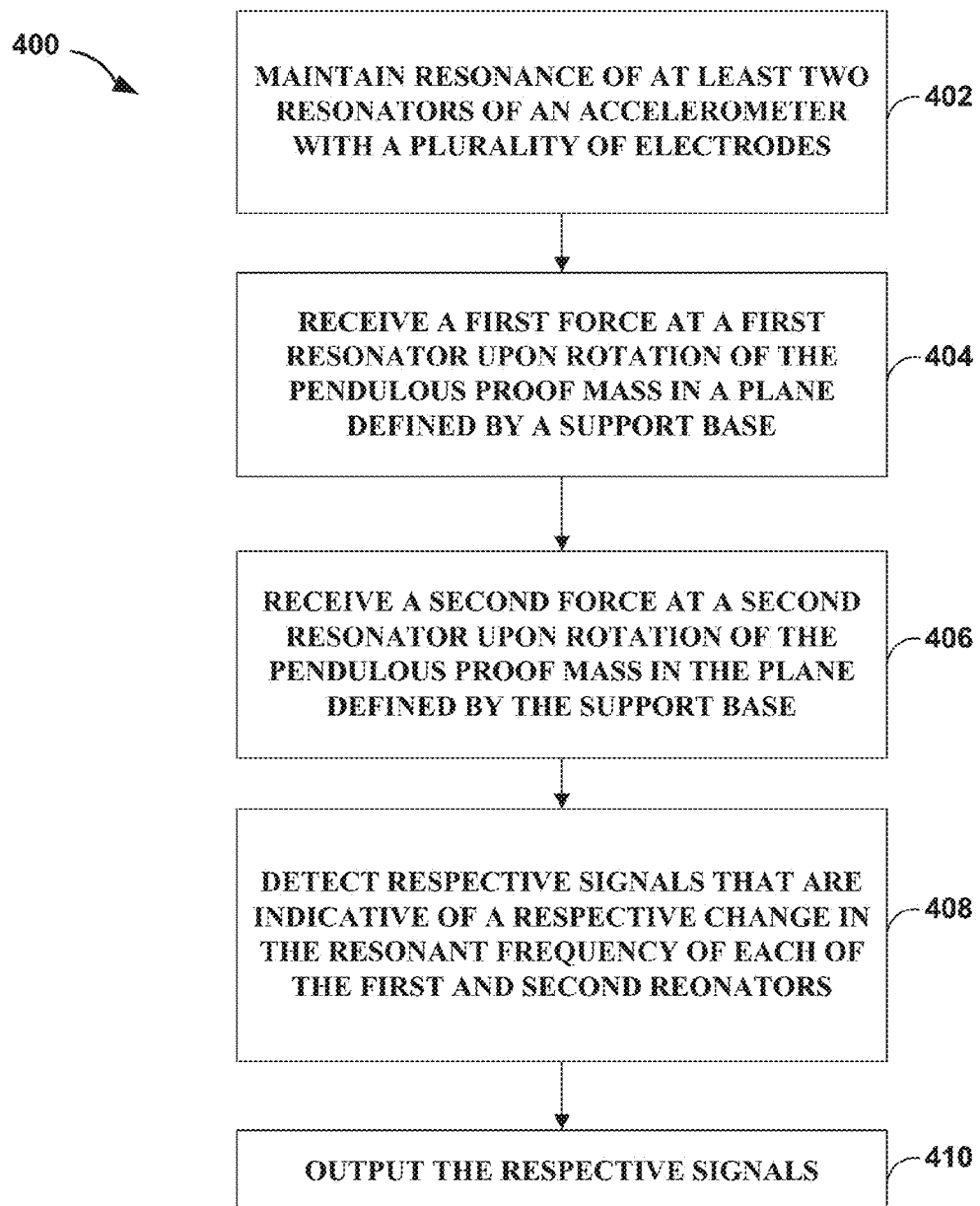
FIG. 6 is a flow chart illustrating an example process of using an accelerometer that includes a pendulous proof mass configured to rotate in a plane defined by a support base, in accordance with the techniques described herein.

FIG. 6 is a flow chart illustrating an example process 400 of using an accelerometer that includes a pendulous proof mass configured to rotate in a plane defined by a support base, in accordance with the techniques described herein. FIG. 6 is described in the context of FIG. 1; however, FIG. 6 may also apply to FIGS. 3 and 4.

A plurality of electrodes (e.g., electrodes 14A and 14B) functioning as drive electrodes in combination with respective oscillator circuits (e.g., oscillator circuits 18) may maintain resonance of at least two resonators (e.g., resonators 16A and 16B) of an accelerometer (402). A first resonator (e.g., resonator 16A) may receive a first force (e.g., tension forces as indicated by arrows 28A and 28B) upon rotation of the pendulous proof mass (e.g., pendulous proof mass 2) in a plane defined by a support base (e.g., support base 8) (404). A second resonator (e.g., resonator 16B) may receive a second force (e.g., compression forces as indicated by arrows 30A and 30B) upon rotation of the pendulous proof mass (e.g., pendulous proof mass 2) in the plane defined by the support base (e.g., support base 8) (406). The plurality of electrodes (e.g., electrodes 14A and 14B) functioning as pickoff electrodes may detect respective signals (e.g., respective tine position pickoff signals) that may indicate a respective change in the resonant frequency of each of the first and second resonators (e.g., resonators 16A and 16B) caused by the first force and the second force (e.g., tension and compression forces as indicated by arrows 28A-28B and 30A-30B, respectively) (408). The accelerometer may output the respective signals (410).

In some examples, the accelerometer may output the respective signals using an oscillator circuit (e.g., oscillator circuits 18) to a processor (e.g., processor 20), which may determine an acceleration measurement based on the respective signals. In some examples, at least one of the two or more resonators may include a double-ended tuning fork (e.g., DETF 66A as described in FIG. 2) located in-plane with the support base and pendulous proof mass (e.g., support base 8 and pendulous proof mass 2), and the frequency of the tines increases during tension forces and decreases during compression forces. In some examples, maintaining the resonance of the at least two resonators of an accelerometer may further include providing, with an oscillator circuit (e.g., oscillator circuits 18) coupled to the plurality of electrodes (e.g., electrodes 14A and 14B), an electric field such that the tines of the DETF continuously vibrate at a resonant frequency. In other examples, maintaining the resonance of the at least two resonators of an accelerometer may further include providing, with an oscillator circuit (e.g., oscillator circuits 18) coupled to the plurality of electrodes (e.g., electrodes 14A and 14B), an electric charge such that the tines of the DETF continuously vibrate at the resonant frequency. In some examples, the plurality of electrodes (e.g., electrodes 14A and 14B) may be a combination of electrodes surrounding a portion of the tines or electrodes on the tines of the resonators. In some examples, the accelerometer may be comprised of a monolithic material and includes a pendulous proof mass, a support base, a flexure, and the two or more resonators. In some examples, the monolithic material may be a piezoelectric material or a silicon material. In some examples, the first force and the second force may be one of tension or compression forces.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A device comprising:
a pendulous proof mass;
a support base defining a plane and configured to support the pendulous proof mass;
a flexure configured to flexibly connect the pendulous proof mass to the support base, wherein the flexure suspends the pendulous proof mass within the support base, and wherein the pendulous proof mass rotates about the flexure in the plane defined by the support base in response to an acceleration of the device in the plane of the support base; and
at least two resonators configured to flexibly connect the pendulous proof mass to the support base and to flex based on the rotation of the pendulous proof mass about the flexure, wherein each of the at least two resonators resonate at a respective resonant frequency,
wherein the pendulous proof mass, the support base, the flexure, and the at least two resonators are comprised of a monolithic material, and
wherein the pendulous proof mass, the flexure, and the at least two resonators are planar.

2. The device of claim 1, further comprising:
a processor configured to determine, based at least in part on a change in the respective resonant frequency of each of the at least two resonators, an acceleration measurement of the acceleration of the device.

3. The device of claim 1, further comprising a tether coupled to the pendulous proof mass, wherein the tether is configured to restrict out-of-plane motion of the pendulous proof mass with respect to the defined plane of the support base.

4. The device of claim 1, wherein at least one of the at least two resonators comprises a double-ended tuning fork (DETF).

5. The device of claim 4, wherein the at least one of the at least two resonators includes a first portion of a plurality of electrodes either surrounding at least a portion of the DETF or on tines of the DETF.

6. The device of claim 1, wherein the at least two resonators are within a threshold number of degrees of perpendicular to the pendulous proof mass.

7. The device of claim 1, wherein the at least two resonators are within a threshold number of degrees of parallel to the pendulous proof mass.

8. The device of claim 1, wherein the at least two resonators and the flexure are connected to a first side of the pendulous proof mass.

9. The device of claim 1, wherein the flexure is connected to a first side of the pendulous proof mass and the at least two resonators are connected to a second side of the pendulous proof mass.

10. The device of claim 1, wherein the at least two resonators include a first resonator receiving tension forces and a second resonator receiving compression forces.

11. The device of claim 1, wherein the monolithic material is at least one of a piezoelectric material or a silicon material.

12. A method comprising:
maintaining, by a plurality of electrodes, resonance of at least two resonators of an accelerometer;
receiving, by a first resonator of the at least two resonators, in response to an acceleration of the accelerometer in a plane defined by a support base of the accelerometer and upon rotation of a pendulous proof mass about a flexure in the plane defined by the support base, a first force;
receiving, by a second resonator of the at least two resonators, in response to the acceleration of the accelerometer in the plane defined by the support base of the accelerometer and upon rotation of the pendulous proof mass about the flexure in the plane defined by the support base, a second force;
detecting, by the plurality of electrodes, respective signals that are indicative of a respective change in the resonant frequency of each of the first and second resonators caused by the first force and the second force; and
outputting, by the accelerometer, the respective signals,
wherein the pendulous proof mass, the support base, the flexure, and the at least two resonators are comprised of a monolithic material, and
wherein the pendulous proof mass, the flexure, and the at least two resonators are planar.

13. The method of claim 12, wherein at least one of the at least two resonators comprises a double-ended tuning fork (DETF).

14. The method of claim 13, wherein maintaining the resonance of the at least two resonators of the accelerometer further comprises:
providing, with an oscillator circuit coupled to the plurality of electrodes, an electric field such that two or more tines of the DETF continuously vibrate at a resonant frequency.

15. The method of claim 13, wherein maintaining the resonance of the at least two resonators of the accelerometer further comprises:
providing, with an oscillator circuit coupled to the plurality of electrodes, an electric charge such that two or more tines of the DETF continuously vibrate at the resonant frequency.

16. The method of claim 12, wherein the monolithic material is at least one of a piezoelectric material or a silicon material.

17. The method of claim 12, wherein the first force and the second force comprise one of tension or compression forces.

18. The method of claim 12, wherein outputting the respective signals comprises outputting, via at least one oscillator circuit of the accelerometer, the respective signals to a processor, the method further comprising determining, by the processor and based on the respective signals, an acceleration measurement.

19. The method of claim 12, wherein the flexure is connected to a first side of the pendulous proof mass and the at least two resonators are connected to a second side of the pendulous proof mass.

20. The device of claim 1, wherein the pendulous proof mass, the flexure, and the at least two resonators have the same thickness.

* * * * *